(12) United States Patent
Sindalovsky et al.

(10) Patent No.: US 8,548,038 B2
(45) Date of Patent: Oct. 1, 2013

(54) PATTERN DETECTOR FOR SERIALIZER-DESERIALIZER ADAPTATION

(75) Inventors: Vladimir Sindalovsky, Perkasie, PA (US); Mohammad S. Mobin, Orefield, PA (US); Lane A. Smith, Easton, PA (US); Amaresh V. Malipatil, San Jose, CA (US); Pervez M. Aziz, Dallas, TX (US)

(73) Assignee: LSI Corporation, Milpitas, CA (US)

( * ) Notice: Subject to any disclaimer, the term of this patent is extended or adjusted under 35 U.S.C. 154(b) by 61 days.

(21) Appl. No.: 13/312,443

(22) Filed: Dec. 6, 2011

(65) Prior Publication Data

US 2013/0142245 A1      Jun. 6, 2013

(51) Int. Cl.
*H03H 7/40* (2006.01)
(52) U.S. Cl.
USPC ............................ 375/232; 375/350; 708/323
(58) Field of Classification Search
USPC ......... 375/229–233, 340, 346, 350; 708/322, 708/323
See application file for complete search history.

(56) References Cited

U.S. PATENT DOCUMENTS

| | | | |
|---|---|---|---|
| 6,052,412 A * | 4/2000 | Ruether et al. | 375/231 |
| 6,807,229 B1 * | 10/2004 | Kim et al. | 375/233 |
| 7,609,102 B2 | 10/2009 | Shanbhag et al. | |
| 7,787,536 B2 * | 8/2010 | Chou | 375/232 |
| 8,019,022 B2 | 9/2011 | Liu et al. | |
| 8,045,608 B2 * | 10/2011 | Dai et al. | 375/232 |
| 8,369,470 B2 * | 2/2013 | Mobin et al. | 375/348 |
| 2005/0047500 A1 * | 3/2005 | Gupta et al. | 375/232 |
| 2008/0031316 A1 * | 2/2008 | Maxim et al. | 375/232 |
| 2010/0086017 A1 * | 4/2010 | Shumarayev et al. | 375/232 |
| 2011/0142120 A1 * | 6/2011 | Liu et al. | 375/233 |

OTHER PUBLICATIONS

Muller, Paul & Lebleblcl, Yusuf; Pattern Generator Model for Jitter-Tolerance Simulation; The Designer's Guide Community; Jul. 18, 2006, pp. 1-19; Version 1.

* cited by examiner

*Primary Examiner* — Dac Ha

(57) ABSTRACT

In described embodiments, a Serializer-Deserializer (Ser-Des) receiver includes a pattern detector that allows for detection of insufficiently randomized pattern periods and low activity periods. A freeze of equalization adaptation during these periods might occur by embedding disqualifying patterns into adaptation data. Some embodiments also allow for detection of long intervals of freeze, and so delay a freeze de-assertion in order for a clock and data recovery (CDR) circuit of the receiver to regain lock to the serial data. Embedding freeze information in the receive data allows for precise synchronization of receive data and freeze.

23 Claims, 8 Drawing Sheets

PATTERN DETECTOR FOR SERIALIZER-DESERIALIZER ADAPTATION

BACKGROUND OF THE INVENTION

A generic communication link comprises a transmitter, communication channel, and receiver. A Serializer-Deserializer (SerDes) receiver is an example of a device that processes analog signals transmitted through a channel, and the SerDes receiver typically includes components to compensate for impairments introduced by the channel. Such impairments typically include added noise and inter-symbol interference characterized by the transfer function of the communication channel. A SerDes receiver includes equalization, for which the datapath typically includes a combination of a Continuous-Time Linear Equalizer (CTLE), a Feed Forward Equalizer (FFE), a Decision Feedback Equalizer (DFE), and various adaptation circuits employed to adapt the various equalizer and filter parameters.

As the serial data stream in a SerDes system is transmitted over a single data link without clock forwarding, the receiver must extract the timing information from the data stream to retime the data. A clock and data recovery (CDR) circuit is usually employed that both extracts timing for a local sampling clock from the sampled data and samples/quantizes the input signal. The accuracy of this operation performed in the CDR circuit is limited by the jitter affecting the received data edges, sometimes referred to as the jitter tolerance (JTOL). A pattern generator of a standardized jitter tolerance source for system compliancy verification generates various bit patterns to test performance of a receiver. For example, a pattern generator of a standardized jitter tolerance source for system compliancy verification generates a so-called compliant jitter tolerance pattern (CJTPAT), composed of the data words representing the worst case condition for jitter tolerance measurement of the receiver, as a means to test JTOL. Other test patterns are known, such as a SAS training pattern, a CRTPAT pattern, and a PN23 pseudo random pattern, for testing jitter tolerance. This testing enables a SerDes implementation to exhibit a relatively good jitter tolerance for similar patterns in actual serial data traffic.

Existing least mean square (LMS) and group delay based adaptation algorithms work well for sufficiently randomized data. When data exhibiting single or dual tones persist in the receive data, these known adaptation algorithms fail to achieve a relatively optimal state during operation. A pattern detector assists in avoiding equalizer adaptation to a known data pattern that might lead to sub-optimal adaptation results. However, the known methods of pattern detection to protect the equalizer adaptation process against harmful patterns only allows for detection of single tones in the receive data, and do not provide for detection of the dual tone which is characteristic to, for example, a CJTPAT test signal.

In addition, the known methods do not address low activity detection, which might lead to possible drifting of the CDR circuit sampling point from the middle location of the data eye. Drifting of the CDR circuit sampling point from the middle location of the data eye, in turn, might make LMS or group delay algorithms misbehave immediately after the end of the low activity region in the receive data. The known methods also do not include a delay in enabling adaptation after the "bad" pattern. Such a delay may be needed for the CDR to regain lock to the center of the eye. Known methods also do not address an exact implementation of equalization adaptation freeze (a point in time when the equalizer's adaptation process is frozen to prevent gross errors in filter/equalizer values during adaptation updates), which might present a significant challenge for aligning of the freeze with adaptation algorithm word size and latency.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention generates data from an input signal received from a channel, while detecting insufficiently randomized pattern periods and low activity periods, and freezing equalization adaptation during these periods. A linear equalizer applies feed-forward equalization to symbols of the input signal based upon a set of feed-forward equalizer parameters; and a decision device generates decisions for the feed-forward equalized symbols of the input signal. A decision feedback equalizer applies decision feedback equalization to the feed-forward equalized symbols of the input signal based upon a set of decision feedback equalizer parameters. The set of feed-forward equalizer parameters and the set of decision feedback equalizer parameters are adaptively generated. A presence of at least one data pattern in the symbols of the input signal is detected, and a freeze signal is generated during the detected presence of the at least one data pattern. At the detected presence of the at least one data pattern, adaptation of one or more of the set of feed-forward equalizer parameters and the set of decision feedback equalizer parameters is disabled based on the freeze signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, a Serializer-Deserializer (SerDes) receiver includes a pattern detector that allows for detection of insufficiently randomized pattern periods and low activity periods. A freeze of equalization adaptation during these periods might occur by embedding disqualifying patterns into adaptation data. Some embodiments of the present invention also allow for detection of long intervals of freeze, and so these embodiments delay a freeze de-assertion in order for a clock and data recovery (CDR) circuit of the receiver to regain lock to the center of the serial data eye. Embedding freeze information in the receive data allows for precise synchronization of receive data and freeze.

Figure 1:
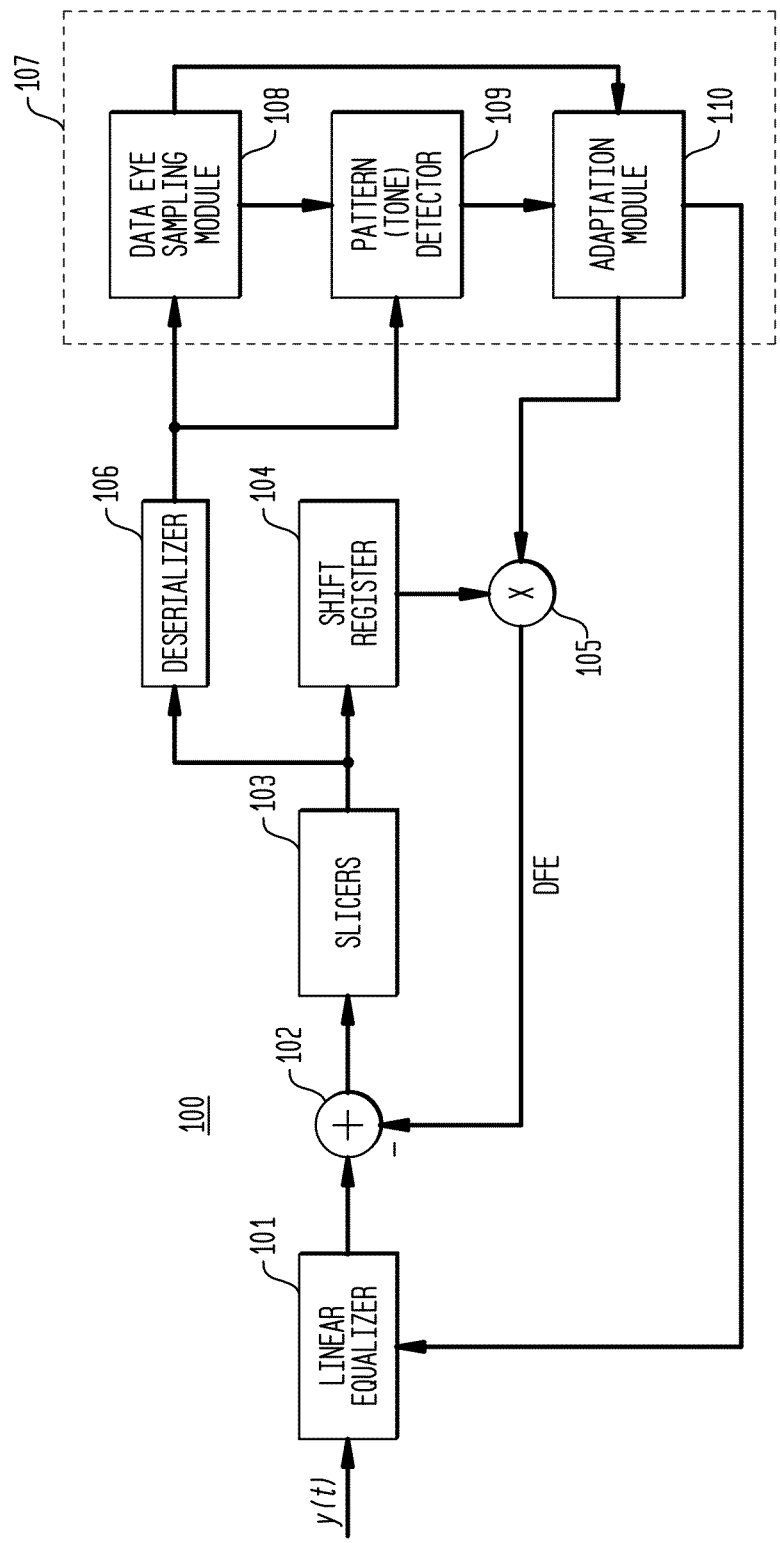
FIG. 1 shows an exemplary clock and data recovery system having a pattern detector operating in accordance with exemplary embodiments of the present invention.

FIG. 1 shows an exemplary clock and data recovery (CDR) system 100 having a pattern detector operating in accordance with exemplary embodiments of the present invention. CDR system 100 comprises linear equalizer 101, and a decision feedback equalizer (DFE) embodied as summing node 102, slicers 103, shift register 104, and multiplier 105. Summing node 102 might be implemented as an adder, but other arithmetic unit(s) might be employed as a combiner for summing node 102, such as a subtracting node and inverters.

In addition, CDR system 100 includes adaptation and freeze circuitry 107 to adapt operation and various parameters, such as those of linear equalizer 101 and decision feedback equalizer (DFE), comprising data eye sampling module 108 (which might be either a dedicated module for pattern recognition, a data eye monitor, or the data sampler itself), pattern detector 109, and adaptation module 110. Optional deserializer 106 might be employed to reduce processing speed of adaptation. Optional deserializer 106 might also be employed to reconstruct estimates of original data words from the serial data decisions of slicers 103 for processing by adaptation and freeze circuitry 107 if higher layer information is employed by circuitry 107 for adaptation algorithms (e.g., word pattern recognition, error detection, and correction).

For CDR system 100 as shown in FIG. 1, serial data that transmitted at a high speed through an interconnect media (e.g., optical fiber, wire) is typically degraded, both by amplitude loss, phase error and jitter, and inter-symbol interference (ISI). Such interconnect media might be characterized by a transfer function, allowing for application of filtering and equalization to the received signal to improve data detection. When the input data stream y(t) is observed with respect to a superposition of a number of data unit intervals (UIs), a "data eye" is observed. Degradation of the data stream symbols by the transfer function of the interconnect media causes the data eye to close both vertically and horizontally. In order to assure data recovery with a low Bit Error Rate (BER), the receive data is enhanced.

In order to achieve these data enhancements, CDR system 100 employs equalization. The data is first enhanced using feed forward (FF) linear equalizer 101, which might be a high pass filter compensating low pass filter effects of the interconnect media. Linear equalizer 101 might be controlled in terms of parameters related to the pole frequency and the amount of boost applied to the input signal. The FF equalized data from linear equalizer 101 might then be subject to decision feedback equalization. Shift register 104 is a form of delay module that retains the history of the previously received bits, which are multiplied in multiplier 105 by corresponding DFE coefficients from adaptation module 110 (described subsequently), and then subtracted in summing node 102 from the output of linear equalizer 101. DFE might typically be employed to cancel ISI acquired in the interconnect media.

Both linear equalizer control parameters and DFE coefficients are typically adapted based on the particular interconnect media and transmitter equalization level. The adaptation is performed in adaptation module 110 employing one or more of the well known algorithms known in the art, such as least mean square (LMS) or group delay equalization. Serial data from summing node 102 is sampled by data slicers 103, which typically provide i) data samples used in data deserialization and equalizer adaptation, ii) transition samples used in CDR phase detector for clock and data recovery and also in group delay adaptation, and iii) error samples used in equalizer LMS based adaptation.

Figure 2:
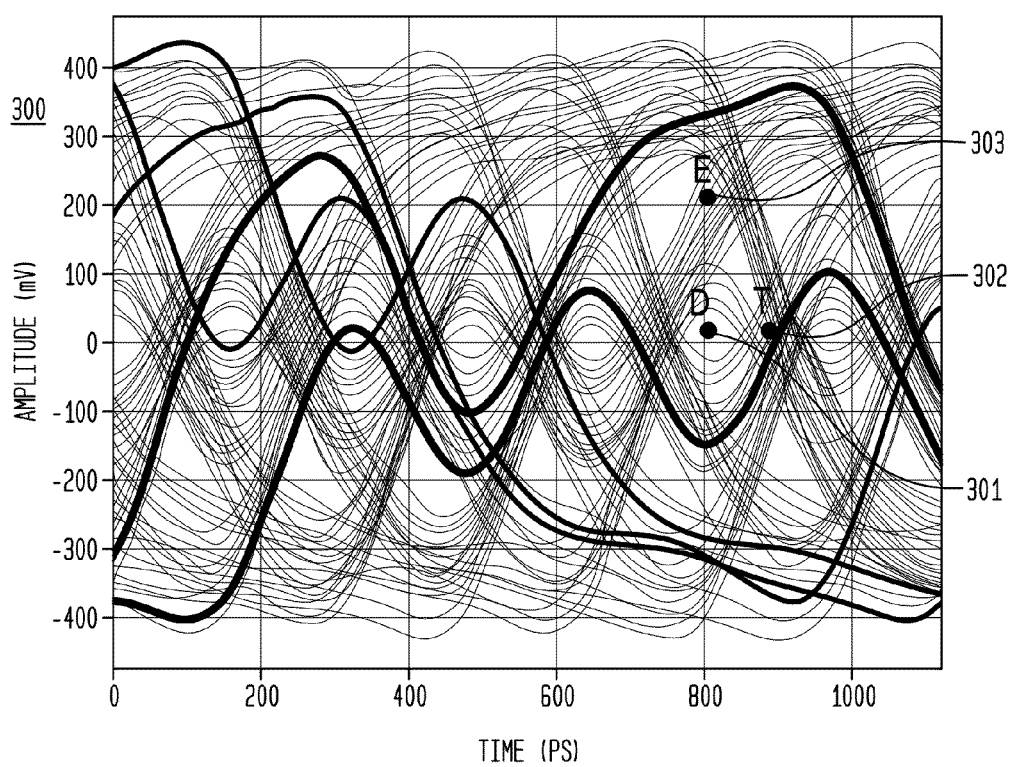
FIG. 2 shows an exemplary data eye diagram illustrating placement of latches for data detection and timing recovery as might be employed by the exemplary system of FIG. 1.

FIG. 2 shows an exemplary data eye diagram illustrating placement of latches for data detection and timing recovery as might be employed by data eye sampling module 108 of the exemplary system of FIG. 1. "Placing" latches in the data eye refers to setting the clock timing and threshold level of a latch to target generating a sample above or below a level at certain point in time with respect to the amplitude and phase of a data symbol and transition between adjacent data symbols. Slicers 103 comprises latches taking data samples shown in FIG. 2 as data slicer D 301, transition slicer T 302, and error slicer E 303. When CDR is properly locked to the incoming data, timing of transition slicer T 302 is aligned with the statistical middle of the data transitions crossing level "0", output of data slicer D 301 is aligned to the center of data eye with zero vertical offset, and error slicer E 303 has the same timing alignment as data slicer D 301, but with a vertical offset. This vertical offset typically places the latch at the statistical middle of the data levels at the upper or lower edge of the eye. The amount of vertical offset for the error latch is a function of equalization adaptation: commonly, one error latch per eye is employed to save power and area in a given implementation, but other implementations have two error latches per eye, one with positive, and one with negative vertical offset. Other implementations might employ more than two error latches per eye.

DFE coefficients C(n) generated by an LMS adaptation algorithm might be described by the following relation:

$$C(n) = \overline{(D_k \oplus \text{Esign}_k)} ? \Sigma_0^\infty \overline{(D_{k-n} E_k)} : 0 \qquad (1)$$

where, for relation (1), if the current data sample $D_k$ has the same sign as the error offset $\text{Esign}_k$ then the data sample offset by the coefficient index n, $D_{k-m}$ is XORed with the current error sample $E_k$ and accumulated as UP or DOWN into the coefficient value C(n). Preferably, for best performance, this LMS adaptation algorithm operates with data that is sufficiently randomized so that the contribution of ISI from data offset by other than "n" is averaged to zero. However, this LMS adaptation algorithm tends to settle to less than an optimum state if receive data is not sufficiently randomized. The most frequent case of poor randomization is the presence of a pattern that corresponds to a single or a dual tone present in the receive data. Adaptation algorithms of error latch offset and LMS based Linear Equalizer adaptation are similar in operation and performance.

Group delay-based linear equalizer adaptation differs in operation, however, but also requires sufficient randomization of receive data. Group delay adaptation usually employs data patterns of two or more bits in the row being equal and then changing to an opposite data bit. Transition sample $Tr_k$ is used in this case as an error bit such that an LEQ control value LEQ is calculated as in relation (2):

$$LEQ = \Sigma_0^\infty (D_{k+1} Tr_k) \qquad (2)$$

Figure 3:
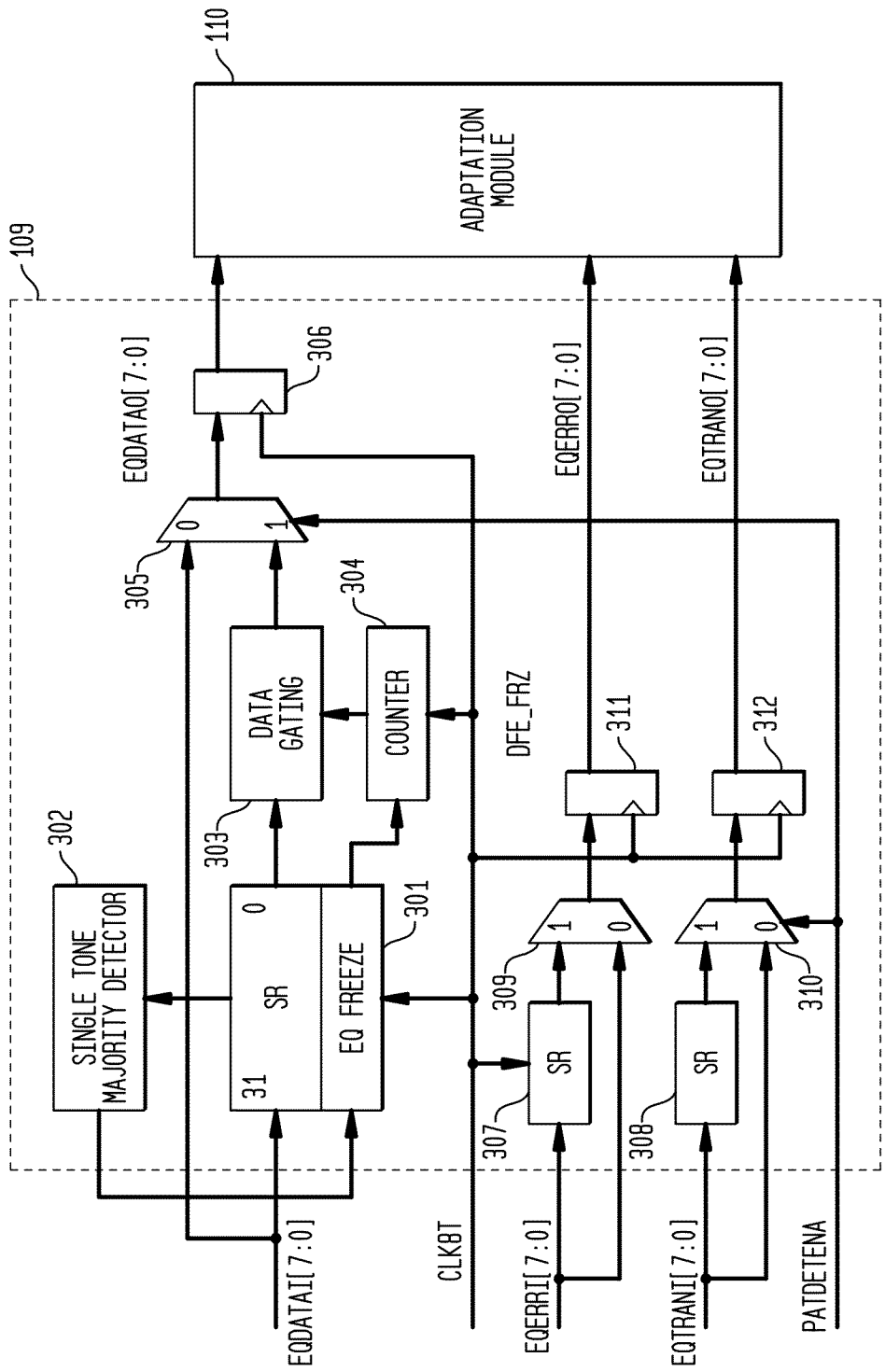
FIG. 3 shows an exemplary embodiment of the pattern detector of FIG. 1.

FIG. 3 shows an exemplary embodiment of the pattern detector 109 of FIG. 1. Pattern detector 109 receives a series of FF equalized data values, FF equalized error values, and FF transition values from data eye sampling module 108 or directly from slicers 103, generated as described above, by data slicer D 301, error slicer E 303, and transition slicer T 302, respectively. Pattern detector 109 comprises shift register/equalizer freeze (SR/EQ Freeze) module 301, single tone majority detector 302, data gating logic 303, and counter 304. Pattern detector 109 further comprises selector (e.g., a mux) 305, latch 306, shift registers (SRs) 307 and 308, selectors 309 and 310, and latches 311 and 312. For the exemplary described embodiment, the data for adaptation from slicers 103 is optionally deserialized to reduce processing speed. The FF equalized data values EQDATAI, FF equalized error values EQERRI, and FF transition values EQTRANI are deserialized into 8 bit width words (corresponding to a 1.5 GHz processing frequency for 12 Gbps serial rate). Due to deserializing, the clock signal employed, CLK8T, has a period equivalent to 8 unit intervals (UI) of serial data.

If pattern detector 109 is enabled when the PATDETENA signal is in an enable state, EQDATAI, EQERRI, and EQTRANI are provided to SR/EQ Freeze module 301, shift register 307, and shift register 308, respectively. SR/EQ Freeze module 301 further deserializes data values EQDATAI into a 32 bit width word in its shift register (SR). The 32 bit data is analyzed in single tone majority detector 302, as subsequently described below with respect to FIG. 4. When single tone, dual tone, or low activity criteria exceeds a predefined level, SR/EQ Freeze module 301 generates an EQ Freeze signal DFE_FRZ that is applied to counter 304, and from counter 304 to data gating logic 303, which generates the data freeze operation. Data gating is described subsequently below. If the duration of the EQ Freeze signal in CLK8T periods exceeds a predefined threshold, the delay is enforced onto EQ Freeze deassertion allowing a predefined period of time for CDR to regain lock to the center of the eye after a single tone, dual tone or low activity in incoming receive signal is over. Another possible option is to make EQ Freeze deassertion delay proportional to the duration of EQ Freeze signal.

Other data, EQERRI and EQTRANI, employed for adaptation of various equalizer and filter parameters by adaptation module 110 is delayed to match the latency of EQDATAI during tone detection by operation of shift register 307 and shift register 308, respectively. If pattern detector 109 is disabled when the PATDETENA signal is in a disable state, EQDATAI, EQERRI, and EQTRANI bypass the detection and latency matching through action of selectors' 305, 309 and 310 circuitry, and after relatching are provided to adaptation module 110. Latches 306, 311 and 312 are employed to store output values of EQDATAO, EQERRO, and EQTRANO, respectively, for use by adaptation module 110 after processing by pattern detector 109.

Figure 4:
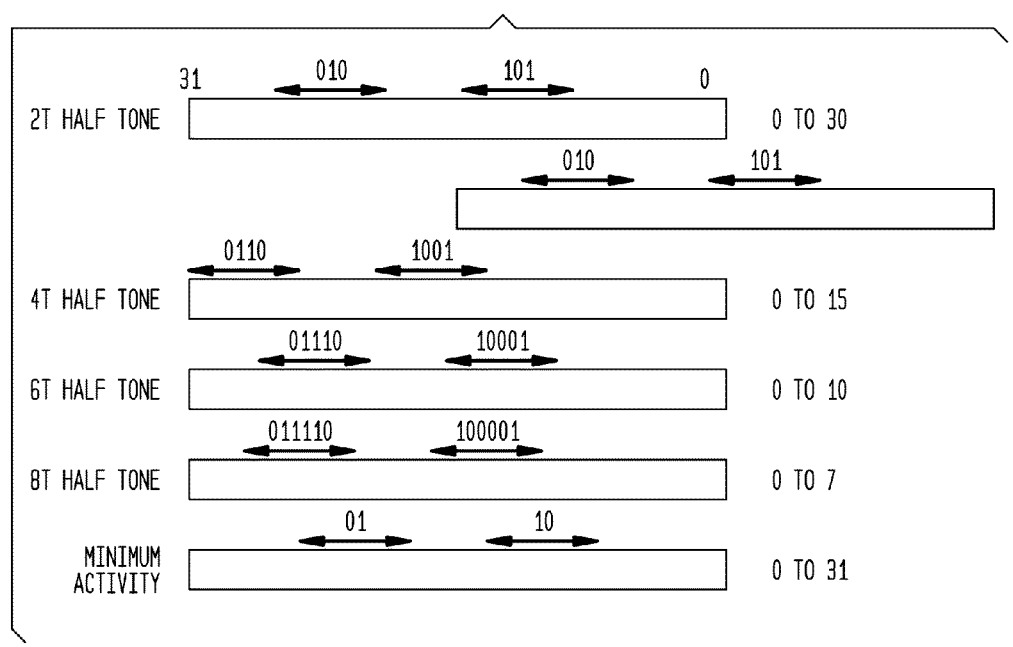
FIG. 4 shows functionality of the single tone majority detector of the exemplary embodiment of FIG. 3.

FIG. 4 illustrates functionality of single tone majority detector 302 of the exemplary embodiment of FIG. 3. The deserialized EQDATAI into 32 bit width receive data words are simultaneously examined in a window for the presence of different half tone patterns. For the exemplary embodiment, the different half tone patterns detected are 2T, 4T, 6T and 8T half tone patterns, although one skilled in the art might generalize the teachings herein to detection of at least one tone pattern that is selected from the group consisting of NT half tones, N being a positive integer greater than 0 and T being related to a period of a received symbol. The number of occurrences of 2T half tone patterns (a "010" or "101") is counted. Similarly, the number of occurrences of 4T half tone patterns ("0110" or "1001"), 6T half patterns ("01110" or "10001"), and 8T half tone patterns ("011110" or "100001") is counted. Also, a sum of any two patterns' occurrences is calculated. An additional calculation determines the minimum activity with every transition counted within the 32 bit window. Detection of half tones is selected for preferred embodiments because it covers non-50% duty cycle cases. For example, 4T half tone will also detect 3T single tone: "0110110 . . . " or "1001001 . . . " The next 32 bit window might be examined with a 16 bit offset in order to minimize fringe effects of patterns spanning the 32 bit word window boundaries.

Returning to FIG. 3, after each calculation of single tones, dual tones, and minimum activity the counted values are compared against one or more predefined thresholds (which, for some embodiments, might be reprogrammable). If the count of single or dual tones exceeds corresponding thresholds or a minimum activity count falls below a predefined threshold, the EQ Freeze signal is generated. The EQ Freeze signal, when active, operates to freeze equalization adaptation to protect the adaptation module 110 of CDR system against processing poorly randomized receive data, thereby avoiding degraded operation.

Aligning of i) the EQ Freeze signal's latency and duration with ii) latency and data quantization (word width) of the adaptation module 110 is complex for some implementations, especially when a large word width is employed by the adaptation module 110 to process and accumulate data at a lower speed. Since this word width may be as large as 256 bits, which makes the freeze duration crude and difficult to align with the boundaries of poorly randomized data, embodiments of the current invention employ data gating logic 303, which "spoils" data provided to adaptation module 110 so as to render the data unfit for adaptation by the adaptation algorithm. For a case with one error slicer per eye (referring to FIG. 2), according to equation (1), the receive data is ignored by an LMS algorithm if data and error offset sign are opposite. For example, if current data is "1" and the error latch offset is negative, or data is "0" and error latch offset is positive, then neither UP or DOWN accumulation requests are generated to counter 304. Error latch offset in each eye is usually set constant for long periods of time or periodically switch at a very low speed, enabling manipulation of the data to adaptation module 110 during a freeze so that adaptation is not moved in any direction.

By illustration, if 2 UI slicing is performed, and both error slicers are set to a positive offset, then EQDATAO (the output of latch 306 of FIG. 3) is forced to all zeroes in data gating logic 303 for the duration of the freeze (which potentially switches at a 16T rate). If both error slicers have negative offset, then EQDATAO is forced to "1111_1111" for the duration of the freeze. If error slicers are offset in opposite directions, then EQDATAO is forced to the Nyquist pattern. After the data is manipulated, matching the latency of the freeze and data processing in adaptation module 110 is not necessary since freeze information is embedded in the data itself.

As described above, group delay based linear equalization typically requires patterns of, for example, "001" or "110" to generate UP or DOWN requests to the accumulator. The data manipulation technique described above prevents group delay based linear equalization from adaptation during freeze periods.

For the case of both positively and negatively offset error slicers, a similar technique might be employed, if the data is split into two separate data inputs to adaptation module 110. These two separate data inputs might generally be equvalent to each other, but manipulated differently during a freeze. Several examples shown in FIGS. 5-8 described below illustrate operation of pattern detector 109 in conjunction with adaptation module 110 to protect adaptation algorithms from poorly randomized data patterns.

Figure 5:
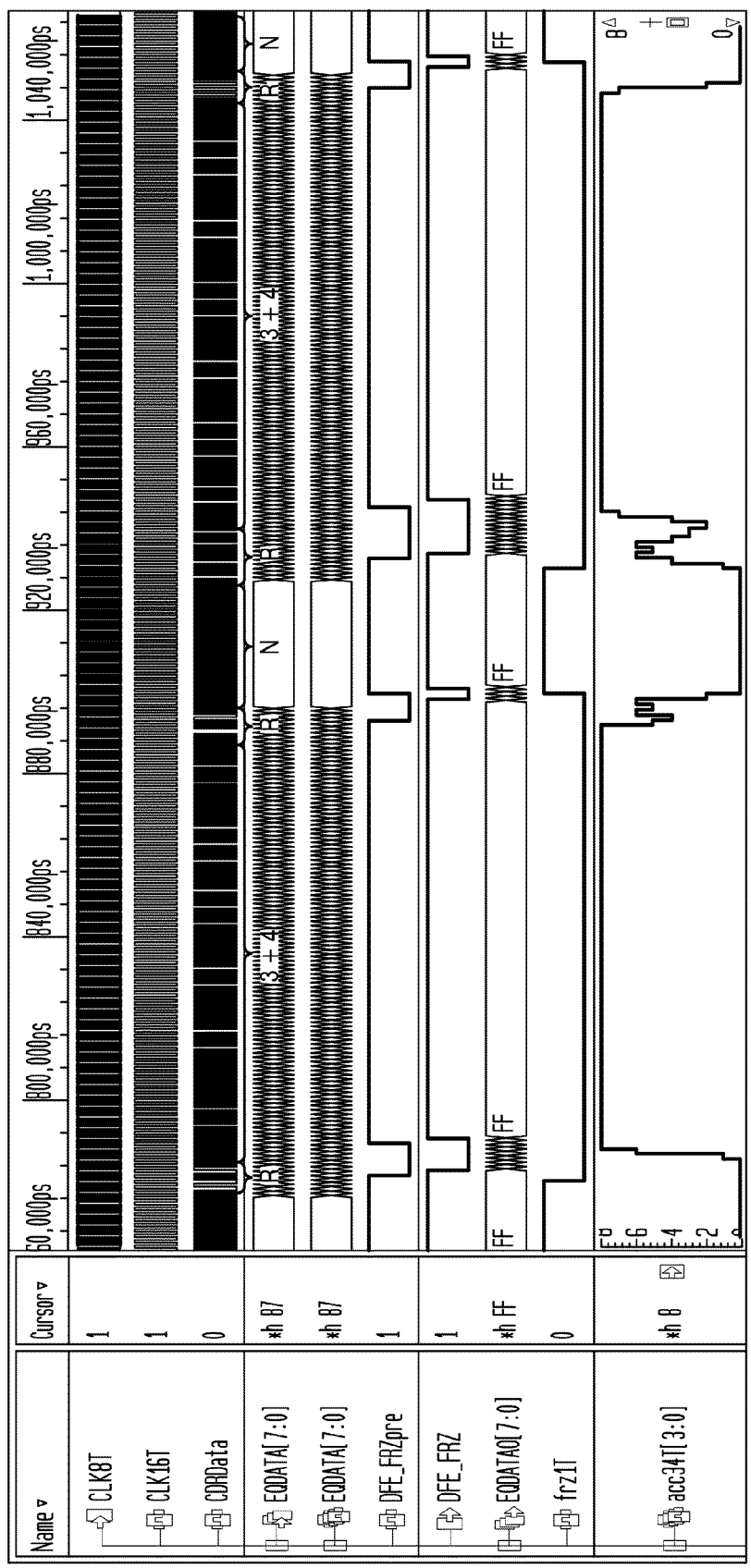
FIG. 5 illustrates operation of the exemplary pattern detector for a CJTPAT pattern.

FIG. 5 illustrates operation of the exemplary pattern detector for a CJTPAT pattern. This CJTPAT pattern is a 8b10b encoded pattern that is specially designed to switch between low and high data transition activity. EQDATAI in FIG. 5 has the following notation for the receive data regions: "3+4" designates a mixture of 3T and 4T half tone pattern features, "N" designates a Nyquist "1010" pattern, "R" designates a sufficiently randomized pattern. As shown in FIG. 5, a "frz1T" is generated during presence of Nyquist pattern regions, and the accumulator for a sum of 3T and 4T features exceeds the programmed threshold of 7 in the "3+4" region. During these periods, the DFE_FRZ freeze signal is generated, and EQDATAO is forced to a 0xFF value (both error slicers are assumed here to have a negative offset). During sufficiently randomized regions, DFE_FRZ is deasserted and adaptation may proceed. The freeze deassertion delay though can be set such that no adaptation will be allowed for the whole duration of CJTPAT.

Figure 6:
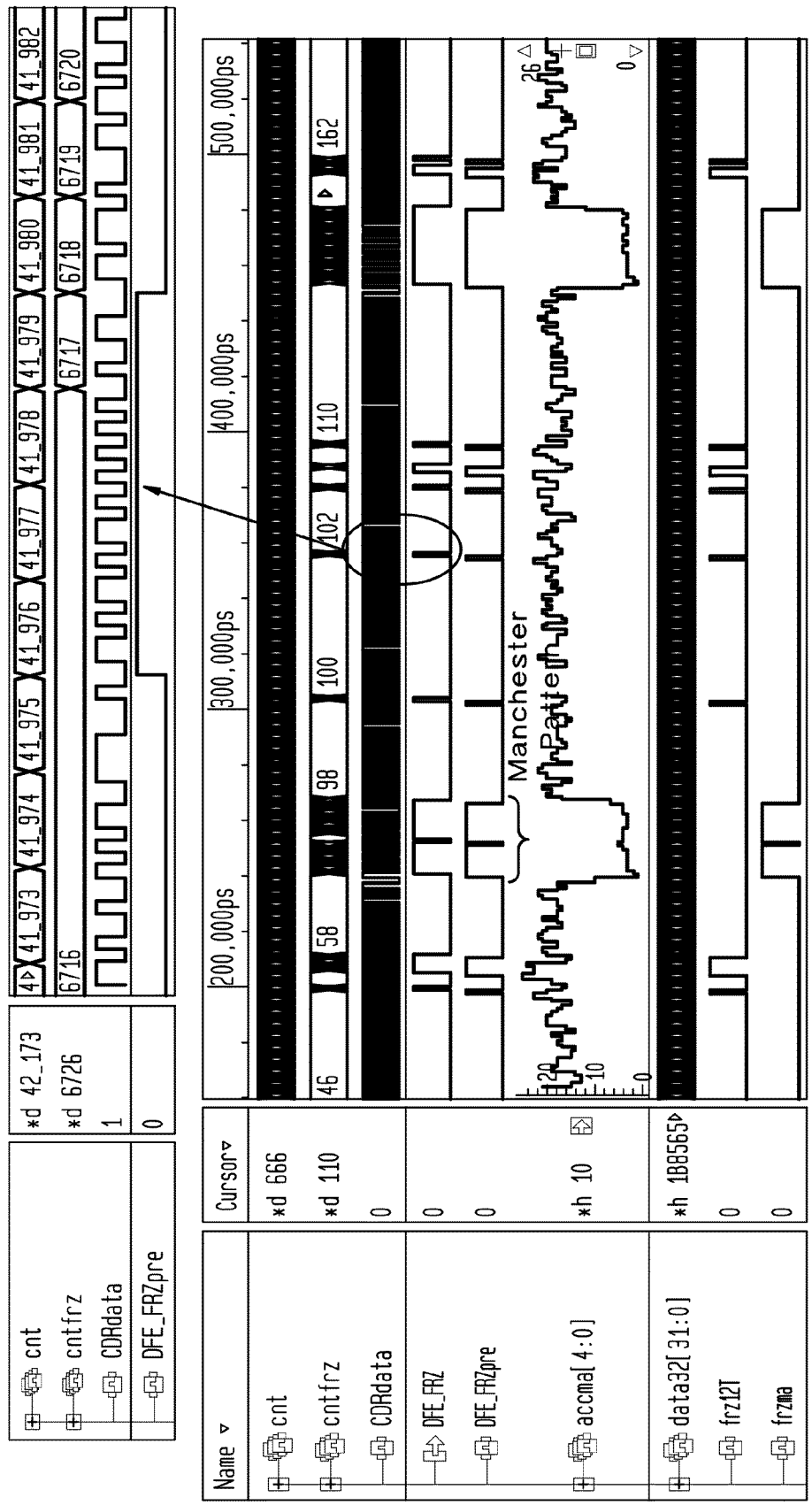
FIG. 6 illustrates operation of the exemplary pattern detector for a SAS training pattern.

FIG. 6 illustrates operation of the exemplary pattern detector for a SAS training pattern. A characteristic of this pattern are regions of Manchester encoding with low switching activity which is used for the back channel adaptation (e.g., conveying instructions to a remote transmitter for adaptation of the transmitter's filters and equalizers). The main requirement for freeze for this pattern is low activity detection during the Manchester Pattern, denoted "frzma" in FIG. 6. The accumulator value for the minimum activity "accma" drops below the programmed threshold of 5, resulting in the freeze. Infrequent and relatively short periods of freeze are occasionally generated clue to a mixture of 1T and 2T half code patterns that exceed the programmed threshold. The zoom view (in insert) in FIG. 6 shows the internal DFE_FRZ signal that is pre generated due to the mixture of two tones exceeding the predefined threshold of 20.

Figure 7:
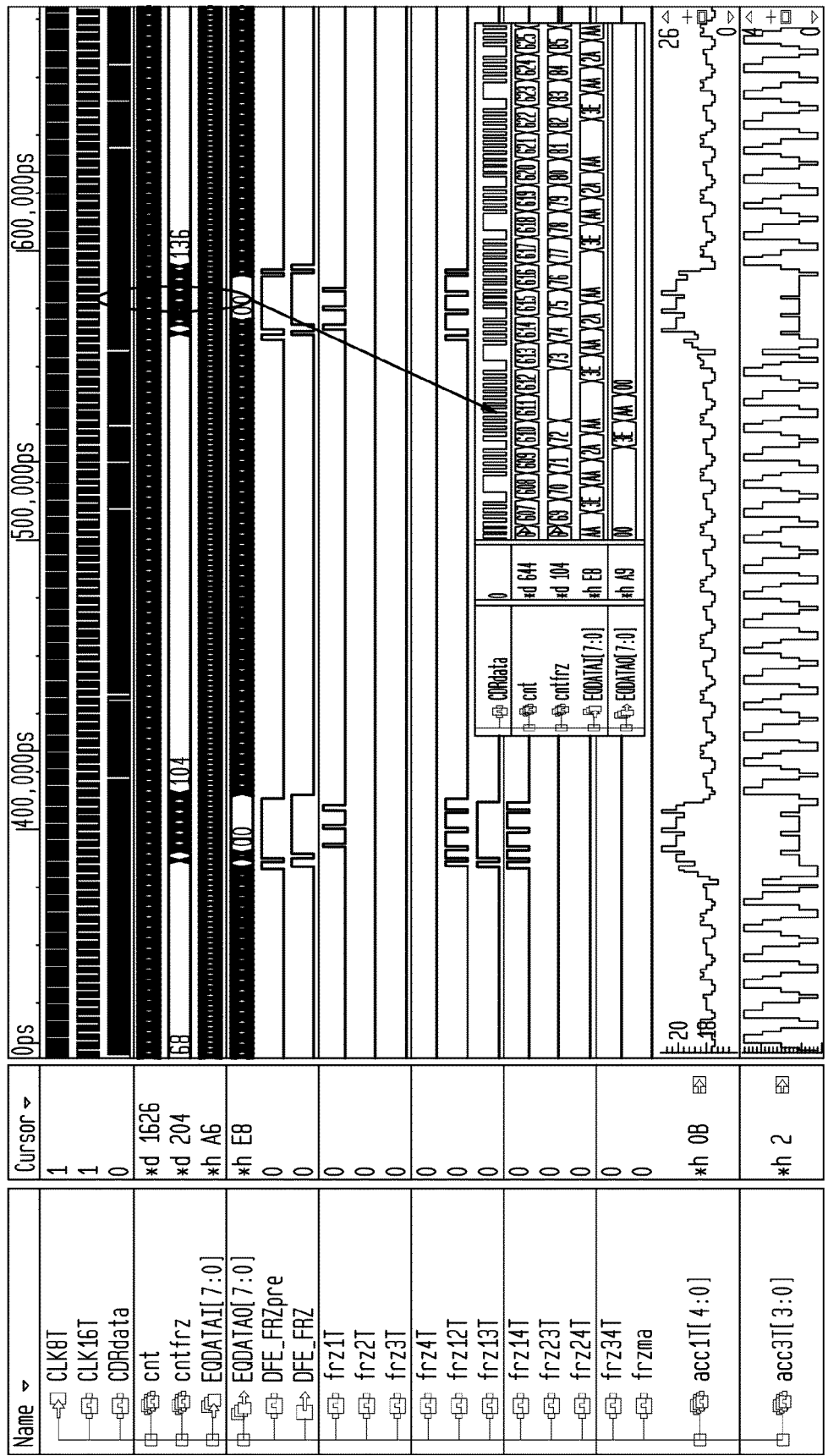
FIG. 7 illustrates operation of the exemplary pattern detector for a CRTPAT pattern.

FIG. 7 illustrates operation of the exemplary pattern detector for a CRTPAT pattern. This CRTPAT pattern, though sufficiently randomized in general, has regions of elevated 1T and 3T half tone activity. During these periods, the DFE_FRZ signal is generated and EQDATAO is forced to 0x00 (for this example, both error slicers are assumed to have positive offset). During poorly randomized regions, the accumulator value for 1T half tone denoted "ace1T" exceeds its programmed threshold of 22, causing mixed tone accumulators (not shown in FIG. 7) to exceed their threshold as well. Mixed tone accumulators exceeding their threshold causes internal freeze signals for 1T, a mixture of 1T and 2T, a mixture of 1T and 3T, and a mixture of 1T and 4T half tones. As a result, the DFE_FRZ signal is generated. The zoom view (in insert) in FIG. 7 shows the prevalence of 1T half tones during one of freeze periods.

Figure 8:
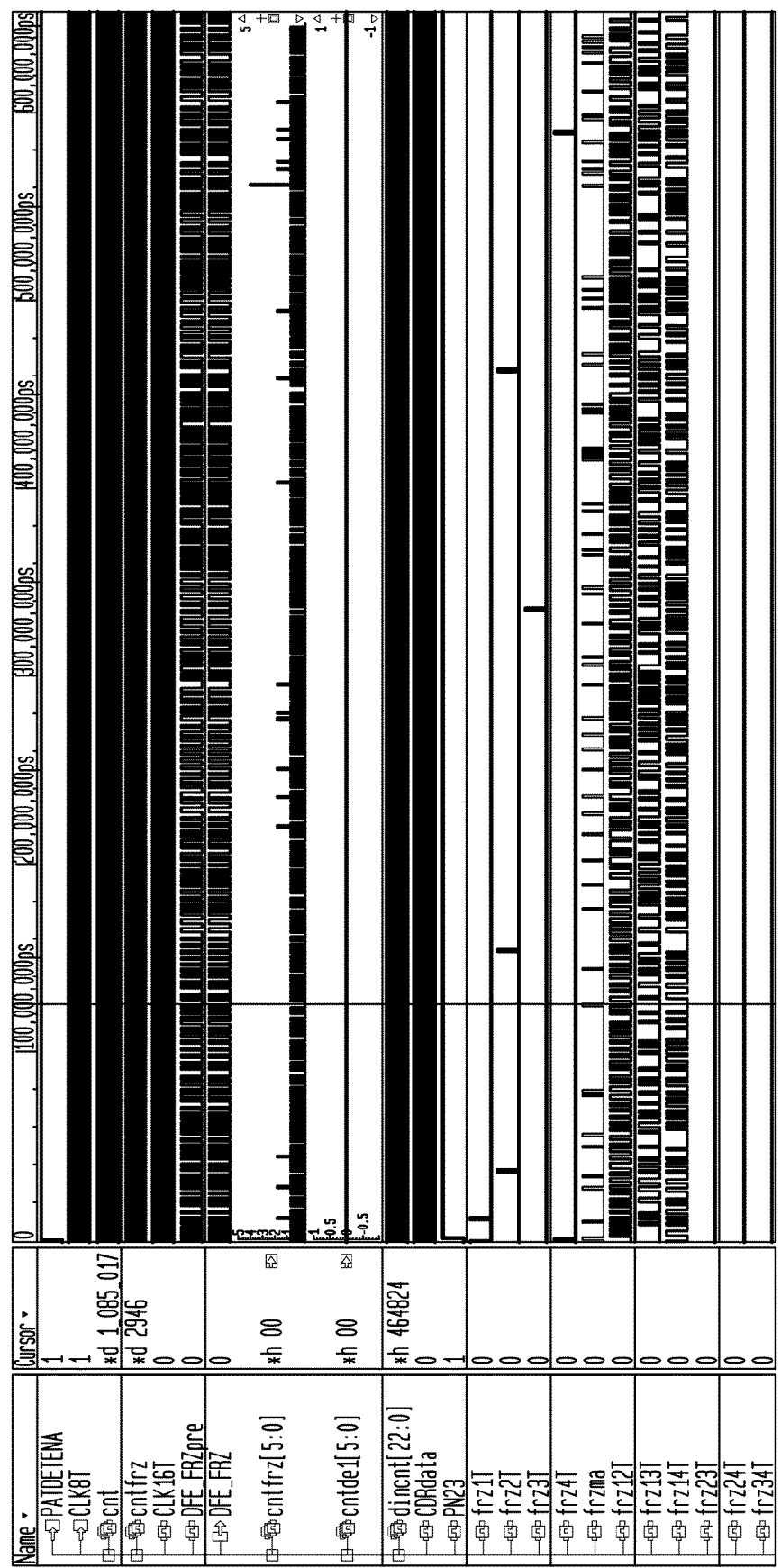
FIG. 8 illustrates operation of the exemplary pattern detector for a PN23 pseudo random pattern.

FIG. 8 illustrates operation of the exemplary pattern detector for a PN23 pseudo random pattern. In the PN23 pseudo random pattern, there are periods of low activity when "frzma" is set high. Some periods with 1T, 2T, and 3T half tone pattern activity exceeding the preprogrammed threshold also exist (denoted frz1T, frz2T, frz3T in FIG. 8), also causing the mixed tones frz12T, frz13T, and frz14T to be set high. The overall percentage of freeze in 16T cycles comprises 0.3%, and the maximum duration of freeze "cntfrz" counted in 16T intervals does not exceed 5, with the majority of freeze duration being 1.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for generating data from an input signal received from a channel, the apparatus comprising:
    a linear equalizer configured to apply feed-forward equalization to symbols of the input signal based upon a set of feed-forward equalizer parameters;
    a decision feedback equalizer configured to apply decision feedback equalization to the feed-forward equalized symbols of the input signal based upon a set of decision feedback equalizer parameters, the decision feedback equalizer comprising a decision device configured to generate decisions for the feed-forward equalized symbols of the input signal; and
    an adaptation and freeze circuit configured to:
        adaptively generate the set of feed-forward equalizer parameters and the set of decision feedback equalizer parameters,
        detect a presence of at least one data pattern in the symbols of the input signal, and
        generate a freeze signal during the detected presence of the at least one data pattern,
        wherein the adaptation and freeze circuit disables adaptation of one or more of the set of feed-forward equalizer parameters and the set of decision feedback equalizer parameters based on the freeze signal.

2. The invention of claim 1, wherein the adaptation and freeze circuit comprises:
    a data eye sampling module configured to generate an equalized data value for each symbol based on a data eye,
    a pattern detector configured to i) detect the at least one tone pattern in a stream of equalized data values from the data eye sampling module corresponding to one or more data patterns and ii) generate the freeze signal based on the detected at least one tone pattern, and
    an adaptation module configured to adaptively generate the set of feed-forward equalizer parameters and the set of decision feedback equalizer parameters based on a window of equalized data values.

3. The invention of claim 2, wherein the pattern detector comprises:
    a shift register and equalizer freeze circuit configured to apply a window to the stream of equalized data values to form a data word;
    a tone majority detector configured to detect one or more tones in the data word of the window, wherein, for each detected tone, the shift register and equalizer freeze circuit generates either a count value for each tone detected by the tone majority detector; and
    an accumulator configured to receive each count value, wherein the accumulator generates the freeze signal when a value of the accumulator either reaches or exceeds a threshold.

4. The invention of claim 3, further comprising data gating logic configured to, based on the presence of the freeze signal, spoil one or more of the corresponding equalized data values provided to the adaptation module, thereby interrupting adaptation by the adaptation module.

5. The invention of claim 2, wherein:
    the data eye sampling module is further configured to generate at least one of an error value and a transition value for each equalized data value; and
    the pattern detector comprises one or more shift registers configured to match a latency of each error value and transition value to the corresponding equalized data value.

6. The invention of claim 2, wherein the delay module is a shift register.

7. The invention of claim 1, wherein the decision feedback equalizer comprises:
    a delay module configured to retain one or more previous decisions corresponding to previous feed-forward equalized symbols;
    a multiplier configured to generate a combination of the previous feed-forward equalized decisions and at least one filter tap value based on a transfer function of the channel, wherein the set of decision feedback equalizer parameters includes the at least one filter tap value; and
    a combiner configured to subtract the combination from the feed-forward equalized symbols.

8. The invention of claim 1, wherein the at least one tone pattern is selected from the group consisting of NT half tones, N being a positive integer greater than 0 and T being related to a period of a received symbol.

9. The invention of claim 1, wherein the decision device is at least one of a comparator and a slicer.

10. The invention of claim 1, wherein the at least one data pattern is one or more of a CJTPAT pattern, a SAS training pattern, a CRTPAT pattern, and a PN23 pseudo random pattern.

11. The invention of claim 1, wherein the apparatus further comprises a deserializer configured to deserialize an output stream of the decisions provided by the decision device, the deserialized output stream applied to the adaptation and freeze circuit.

12. The invention of claim 1, wherein the apparatus is embodied in a receiver of a Serializer-Deserializer (SerDes) device.

13. A method of generating data from an input signal received from a channel, the method comprising:

applying, with a linear equalizer, feed-forward equalization to symbols of the input signal based upon a set of feed-forward equalizer parameters;

generating, with a decision device, decisions for the feed-forward equalized symbols of the input signal;

applying, with a decision feedback equalizer, decision feedback equalization to the feed-forward equalized symbols of the input signal based upon a set of decision feedback equalizer parameters;

adaptively generating the set of feed-forward equalizer parameters and the set of decision feedback equalizer parameters, detecting a presence of at least one data pattern in the symbols of the input signal;

generating a freeze signal during the detected presence of the at least one data pattern; and disabling adaptation of one or more of the set of feed-forward equalizer parameters and the set of decision feedback equalizer parameters based on the freeze signal.

14. The invention of claim 13, comprising:

generating, with a data eye sampling module, an equalized data value for each symbol based on a data eye;

detecting, with a pattern detector, the at least one tone pattern in a stream of equalized data values from the data eye sampling module corresponding to one or more data patterns;

generating, with the pattern detector, the freeze signal based on the detected at least one tone pattern, and adaptively generating, with an adaptation module, the set of feed-forward equalizer parameters and the set of decision feedback equalizer parameters based on a window of equalized data values.

15. The invention of claim 14, comprising:

applying, with a shift register and equalizer freeze circuit, a window to the stream of equalized data values to form a data word;

detecting, by a tone majority detector, one or more tones in the data word of the window, wherein, for each detected tone, generating, by the shift register and equalizer freeze circuit, a count value for each tone detected by the tone majority detector;

accumulating, in an accumulator, each count value; and generating, by an accumulator, the freeze signal when a value of the accumulator either reaches or exceeds a threshold.

16. The invention of claim 15, further comprising, based on the presence of the freeze signal, spoiling one or more of the corresponding equalized data values provided to the adaptation module, thereby interrupting adaptation by the adaptation module.

17. The invention of claim 14, comprising:

generating, with the data eye sampling module, at least one of an error value and a transition value for each equalized data value; and matching, by one or more shift registers, a latency of each error value and transition value to the corresponding equalized data value.

18. The invention of claim 13, wherein the at least one tone pattern is selected from the group consisting of NT half tones, N being a positive integer greater than 0 and T being related to a period of a received symbol.

19. The invention of claim 13, wherein the at least one data pattern is one or more of a CJTPAT pattern, a SAS training pattern, a CRTPAT pattern, and a PN23 pseudo random pattern.

20. A non-transitory machine-readable storage medium, having encoded thereon program code, wherein, when the program code is executed by a machine, the machine implements a method for generating data from an input signal received from a channel, comprising the steps of:

applying, with a linear equalizer, feed-forward equalization to symbols of the input signal based upon a set of feed-forward equalizer parameters;

generating, with a decision device, decisions for the feed-forward equalized symbols of the input signal;

applying, with a decision feedback equalizer, decision feedback equalization to the feed-forward equalized symbols of the input signal based upon a set of decision feedback equalizer parameters;

adaptively generating the set of feed-forward equalizer parameters and the set of decision feedback equalizer parameters, detecting a presence of at least one data pattern in the symbols of the input signal;

generating a freeze signal during the detected presence of the at least one data pattern; and disabling adaptation of one or more of the set of feed-forward equalizer parameters and the set of decision feedback equalizer parameters based on the freeze signal.

21. Apparatus for generating data from an input signal received from a channel, the apparatus comprising:

a linear equalizer configured to apply feed-forward equalization to symbols of the input signal based upon a set of feed-forward equalizer parameters;

a decision feedback equalizer configured to apply decision feedback equalization to the feed-forward equalized symbols of the input signal based upon a set of decision feedback equalizer parameters, the decision feedback equalizer comprising a decision device configured to generate decisions for the feed-forward equalized symbols of the input signal; and an adaptation and freeze circuit comprising:

a data eye sampling module configured to generate an equalized data value for each symbol based on a data eye;

an adaptation module configured to adaptively generate the set of feed-forward equalizer parameters and the set of decision feedback equalizer parameters based on a window of equalized data values, a pattern detector configured to (i) detect a presence of at least one tone pattern in a stream of equalized data values from the data eye sampling module corresponding to one or more data patterns and (ii) generate a freeze signal based on the detected at least one tone pattern, the pattern detector comprising:

a shift register and equalizer freeze circuit configured to apply a window to the stream of equalized data values to form a data word;

a tone majority detector configured to detect one or more tones in the data word of the window, wherein, for each detected tone, the shift register and equalizer freeze circuit generates either a count value for each tone detected by the tone majority detector; and an accumulator configured to receive each count value, wherein the accumulator generates the freeze signal when a value of the accumulator either reaches or exceeds a threshold;

wherein the adaptation and freeze circuit disables adaptation of one or more of the set of feed-forward equalizer parameters and the set of decision feedback equalizer parameters based on the freeze signal.

22. A method of generating data from an input signal received from a channel, the method comprising:
- applying, with a linear equalizer, feed-forward equalization to symbols of the input signal based upon a set of feed-forward equalizer parameters;
- generating, with a decision device, decisions for the feed-forward equalized symbols of the input signal;
- applying, with a decision feedback equalizer, decision feedback equalization to the feed-forward equalized symbols of the input signal based upon a set of decision feedback equalizer parameters;
- generating, with a data eye sampling module, an equalized data value for each symbol based on a data eye;
- detecting, with a pattern detector, the at least one tone pattern in a stream of equalized data values from the data eye sampling module corresponding to one or more data patterns;
- generating, with the pattern detector, the freeze signal based on the detected at least one tone pattern;
- adaptively generating, with an adaptation module, the set of feed-forward equalizer parameters and the set of decision feedback equalizer parameters based on a window of equalized data values;
- applying, with a shift register and equalizer freeze circuit, a window to the stream of equalized data values to form a data word;
- detecting, by a tone majority detector, one or more tones in the data word of the window, wherein, for each detected tone, generating, by the shift register and equalizer freeze circuit, a count value for each tone detected by the tone majority detector;
- accumulating, in an accumulator, each count value;
- generating, by the accumulator, the freeze signal when a value of the accumulator either reaches or exceeds a threshold; and
- disabling adaptation of one or more of the set of feed-forward equalizer parameters and the set of decision feedback equalizer parameters based on the freeze signal.

23. A non-transitory machine-readable storage medium, having encoded thereon program code, wherein, when the program code is executed by a machine, the machine implements a method for generating data from an input signal received from a channel, comprising the steps of:
- applying, with a linear equalizer, feed-forward equalization to symbols of the input signal based upon a set of feed-forward equalizer parameters;
- generating, with a decision device, decisions for the feed-forward equalized symbols of the input signal;
- applying, with a decision feedback equalizer, decision feedback equalization to the feed-forward equalized symbols of the input signal based upon a set of decision feedback equalizer parameters;
- generating, with a data eye sampling module, an equalized data value for each symbol based on a data eye;
- detecting, with a pattern detector, the at least one tone pattern in a stream of equalized data values from the data eye sampling module corresponding to one or more data patterns;
- generating, with the pattern detector, the freeze signal based on the detected at least one tone pattern;
- adaptively generating, with an adaptation module, the set of feed-forward equalizer parameters and the set of decision feedback equalizer parameters based on a window of equalized data values;
- applying, with a shift register and equalizer freeze circuit, a window to the stream of equalized data values to form a data word;
- detecting, by a tone majority detector, one or more tones in the data word of the window, wherein, for each detected tone, generating, by the shift register and equalizer freeze circuit, a count value for each tone detected by the tone majority detector;
- accumulating, in an accumulator, each count value;
- generating, by the accumulator, the freeze signal when a value of the accumulator either reaches or exceeds a threshold; and
- disabling adaptation of one or more of the set of feed-forward equalizer parameters and the set of decision feedback equalizer parameters based on the freeze signal.

* * * * *